US010595266B2

(12) United States Patent
Liu et al.

(10) Patent No.: US 10,595,266 B2
(45) Date of Patent: Mar. 17, 2020

(54) SENDING AND ACQUIRING WIFI NETWORKING INFORMATION

(71) Applicant: Alibaba Group Holding Limited, Grand Cayman (KY)

(72) Inventors: Sunliang Liu, Hangzhou (CN); Ming Zhang, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

(21) Appl. No.: 15/917,033

(22) Filed: Mar. 9, 2018

(65) Prior Publication Data

US 2018/0199265 A1 Jul. 12, 2018

Related U.S. Application Data

(63) Continuation of application No. PCT/CN2016/098010, filed on Sep. 5, 2016.

(30) Foreign Application Priority Data

Sep. 10, 2015 (CN) .......................... 2015 1 0571603

(51) Int. Cl.
*H04W 48/08* (2009.01)
*H04W 76/23* (2018.01)
(Continued)

(52) U.S. Cl.
CPC ............ *H04W 48/08* (2013.01); *H04W 48/16* (2013.01); *H04W 76/11* (2018.02); *H04W 76/14* (2018.02); *H04W 76/23* (2018.02)

(58) Field of Classification Search
None
See application file for complete search history.

(56) References Cited

U.S. PATENT DOCUMENTS

| 9,002,281 | B2* | 4/2015 | Fwu | ...................... | H04W 72/02 |
| | | | | | 455/63.1 |
| 2011/0106837 | A1* | 5/2011 | Walton | .................. | H04W 48/16 |
| | | | | | 707/769 |

(Continued)

FOREIGN PATENT DOCUMENTS

CN 103217963 7/2013
CN 103607751 A 2/2014
(Continued)

OTHER PUBLICATIONS

Translation of International Search Report from corresponding PCT application No. PCT/CN2016/098010 dated Nov. 7, 2016, 2 pages.
(Continued)

*Primary Examiner* — Jamaal Henson
(74) *Attorney, Agent, or Firm* — Lee & Hayes, P.C.

(57) ABSTRACT

A method for sending and acquiring WiFi networking information including generating, by a first WiFi-type smart device, a management frame that carries WiFi networking information; sending the management frame to be monitored by a second WiFi-type smart device; monitoring, by the second WiFi-type smart device, the management frame sent by the first WiFi-type smart device; and parsing the management frame to obtain the WiFi networking information, so that a network may be accessed by using the obtained WiFi networking information. The techniques of the present disclosure may reduce the time delay and technological complexity of a WiFi-type smart device in accessing a network.

15 Claims, 11 Drawing Sheets

(51) Int. Cl.
*H04W 76/14* (2018.01)
*H04W 76/11* (2018.01)
*H04W 48/16* (2009.01)

(56) References Cited

U.S. PATENT DOCUMENTS

| | | | | |
|---|---|---|---|---|
| 2012/0120934 A1* | 5/2012 | Cho | ............... | H04W 40/24 370/338 |
| 2012/0316963 A1* | 12/2012 | Moshfeghi | ............ | G06Q 20/20 705/14.58 |
| 2013/0045678 A1* | 2/2013 | Lee | ............... | H04W 4/08 455/39 |
| 2013/0217359 A1* | 8/2013 | Cherian | ............... | H04W 4/70 455/411 |
| 2013/0322416 A1* | 12/2013 | Son | ............... | H04W 84/02 370/338 |
| 2014/0003286 A1* | 1/2014 | Estevez | ............... | H04W 48/02 370/254 |
| 2014/0064184 A1* | 3/2014 | Cherian | ............... | H04L 61/103 370/328 |
| 2014/0269646 A1* | 9/2014 | Ramasamy | ............ | H04W 76/14 370/338 |
| 2015/0061970 A1 | 3/2015 | Kim et al. | | |

FOREIGN PATENT DOCUMENTS

| | | |
|---|---|---|
| CN | 103901844 | 7/2014 |
| CN | 104243103 | 12/2014 |
| CN | 105744642 | 7/2016 |

OTHER PUBLICATIONS

Translation of Written Opinion from corresponding PCT application No. PCT/CN2016/098010 dated Nov. 7, 2016, 9 pages.
English-language translation of First Office Action dated Nov. 5, 2018 by the State Intellectual Property Office of the People's Republic of China in corresponding Application No. 201510571603 (12 pages).
English translation the Second Chinese Office Action dated Jul. 19, 2019, for Chinese Patent Application No. 2015105716031, a counterpart foreign application of U.S. Appl. No. 15/917,033, 18 pages.
Machine translation (English) of the Chinese Search Report for Chinese Patent Application No. 2015105716031, dated Jun. 27, 2019, 3 pages.

* cited by examiner

SENDING AND ACQUIRING WIFI NETWORKING INFORMATION

CROSS REFERENCE TO RELATED PATENT APPLICATIONS

This application claims priority to and is a continuation of PCT Patent Application No. PCT/CN2016/098010, filed on 5 Sep. 2016, which claims priority to Chinese Patent Application No. 201510571603.1, filed on 10 Sep. 2015 and entitled "METHOD FOR SENDING AND ACQUIRING WIFI NETWORKING INFORMATION AND CORRESPONDING APPARATUS," which are incorporated herein by reference in their entirety.

TECHNICAL FIELD

The present disclosure relates to the field of computer application technologies and, more particularly, to methods and apparatuses for sending and acquiring WiFi networking information.

BACKGROUND

With the rise of smart hardware, more and more smart devices are entering people's lives. Accordingly, how to enable a WiFi-type smart device (which is a smart device with a built-in WiFi module, and may access a network by using the WiFi module) to access a network has become a problem.

As WiFi-type smart devices, such as a smart air conditioner, a smart humidifier, and a smart weighing machine, do not have include screen similar to PCs, mobile phones, tablet computers, and so on, a user cannot connect such WiFi-type smart devices to a network by manually finding a wireless router and entering a password. In other words, lots of WiFi-type smart devices may detect a nearby wireless router, but cannot let users know what networks the devices detect or "see". The users cannot connect the WiFi-type smart devices to the network by using direct manual interaction (for example, entering a service set identifier (SSID) and a password of the wireless router by using a keyboard or touch screen).

The following several implementation methods are mainly employed in the industry at present to solve the foregoing problem.

First method: a mobile phone sends a data packet to a router by using the User Datagram Protocol (UDP), and the router forwards the data packet. The data packet may carry only a small amount of information, that is, one packet may only carry 1-byte information at most. Therefore, a group of data packets need to be sent, and WiFi networking information is transmitted based on a regular change of the packet length. The WiFi-type smart device parses a group of data packets and acquires WiFi networking information from the data packets, to access the network.

For this method, many data packets need to be sent, and the sending process takes a long sending time, leading to an excessively long time for the WiFi-type smart device to acquire the WiFi networking information. In addition, to prevent packet loss, high development requirements or skills are imposed on the development of a fault-tolerant algorithm, increasing the technological complexity.

Second method: a mobile phone sends a multicast data packet to a router by using the UDP, and the router forwards the multicast data packet. The WiFi-type smart device parses the multicast data packet and acquires WiFi networking information from the multicast data packet, to access the network. However, this method has a prominent multicast compatibility problem. Some routers on which a specific option (e.g., IGMP Snooping) is enabled will not forward the multicast data packet. Thus, the WiFi-type smart device cannot access the network in a short time.

SUMMARY OF THE INVENTION

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides methods and apparatuses for sending and acquiring WiFi networking information, so that the time delay and technological complexity of a WiFi-type smart device in accessing a network may be reduced.

The present disclosure provides a method for sending WiFi networking information, which includes:

generating, by a first WiFi-type smart device, a management frame that carries WiFi networking information; and sending the management frame to be monitored by a second WiFi-type smart device.

According to an example implementation of the present disclosure, the management frame includes: a probe request frame, a probe response frame, an association request frame, a reassociation request frame, an action frame or a beacon frame.

According to an example implementation of the present disclosure, the WiFi networking information includes a feature code, an SSID (service set identifier) and a password.

According to an example implementation of the present disclosure, the WiFi networking information includes an identifier indicating provision of a networking information service.

The method may further include:

sending an SSID and a password through a connection that is established by the first WiFi-type smart device and the second WiFi-type smart device by a direct connection between the first WiFi-type smart device and the second WiFi-type smart device, such as WiFi direct. Such direction connection between the first WiFi-type smart device and the second WiFi-type smart device does not require using a third party device such as a router to connect the first WiFi-type smart device and the second WiFi-type smart device at first. For instance, WiFi direct is a technique that enables WiFi devices to connect directly, making it simple and convenient to do things like print, share, sync and display. Products using WiFi direct may connect to one another without joining a traditional home, office or hotspot network. For another example, such direct connection may be other direct wireless or wired connection, such as Bluetooth connection between the first WiFi-type smart device and the second WiFi-type smart device.

According to an example implementation of the present disclosure, the method further includes: establishing, by the first WiFi-type smart device, a connection with the second WiFi-type smart device by using WiFi direct; and the management frame that carries WiFi networking information is a management frame sent in the process of establishing the connection.

According to an example implementation of the present disclosure, the WiFi networking information includes a feature code, an SSID and a password; and the WiFi networking information includes an SSID and a password, and the WiFi networking information is carried in a specified extension field of the management frame.

According to an example implementation of the present disclosure, the information sent together with the SSID and the password further includes at least one of verification information, encryption information and router authentication information; and the SSID and the password are encrypted data when the encryption information is sent.

According to an example implementation of the present disclosure, the method further includes:

receiving, by the first WiFi-type smart device, feedback information indicating whether access to a network is successful from the second WiFi-type smart device.

According to an example implementation of the present disclosure, the step of sending the management frame includes:

sending, by the first WiFi-type smart device, the management frame by invoking a WiFi direct interface; or sending, by the first WiFi-type smart device, the management frame by invoking a custom interface or a self-defined interface.

The present disclosure further provides another method for acquiring WiFi networking information, the method including:

monitoring, by a second WiFi-type smart device, a management frame sent by a first WiFi-type smart device; and parsing the management frame to obtain the WiFi networking information.

According to an example implementation of the present disclosure, the management frame includes: a probe request frame, a probe response frame, an association request frame, a reassociation request frame, an action frame or a beacon frame.

According to an example implementation of the present disclosure, the WiFi networking information includes a feature code, an SSID and a password.

According to an example implementation of the present disclosure, the method further includes:

establishing a connection with the first WiFi-type smart device by using WiFi direct if the second WiFi-type smart device parses out an identifier indicating provision of a networking information service from the management frame, and receiving an SSID and a password through the established connection.

According to an example implementation of the present disclosure, the method further includes: establishing, by the second WiFi-type smart device, a connection with the first WiFi-type smart device by using WiFi direct; and parsing, by the second WiFi-type smart device, the management frame received in the process of establishing the connection, to obtain the WiFi networking information.

According to an example implementation of the present disclosure, the WiFi networking information includes a feature code, an SSID and a password.

According to an example implementation of the present disclosure, the step of parsing the management frame to obtain the WiFi networking information includes:

determining, by the second WiFi-type smart device, a monitored management frame in which a feature code is consistent with preset feature code information; and parsing out the SSID and the password from the management frame based on a predetermined WiFi networking information format.

According to an example implementation of the present disclosure, the WiFi networking information includes: an SSID and a password; and the step of parsing the management frame to obtain the WiFi networking information includes: parsing out, by the second WiFi-type smart device, the SSID and the password from a specified extension field of the management frame.

According to an example implementation of the present disclosure, the method further includes at least one of the following:

verifying, by the second WiFi-type smart device, the SSID and the password by using verification information received together with the SSID and the password;

decrypting, by the second WiFi-type smart device, the SSID and the password by using encryption information received together with the SSID and the password; and sending, by the second WiFi-type smart device, an authentication request to an accessed wireless router by using router authentication information received together with the SSID and the password.

According to an example implementation of the present disclosure, the method further includes:

sending, by the second WiFi-type smart device, feedback information indicating whether access to a network is successful to the first WiFi-type smart device after the second WiFi-type smart device attempts to access the network by using the SSID and the password.

The present disclosure further provides an apparatus for sending WiFi networking information, disposed in a first WiFi-type smart device, which including:

a generation unit configured to generate a management frame that carries WiFi networking information; and a first sending unit configured to send the management frame to be monitored by a second WiFi-type smart device.

According to an example implementation of the present disclosure, the management frame includes: a probe request frame, a probe response frame, an association request frame, a reassociation request frame, an action frame or a beacon frame.

According to an example implementation of the present disclosure, the WiFi networking information includes a feature code, an SSID and a password.

According to an example implementation of the present disclosure, the WiFi networking information includes an identifier indicating provision of a networking information service.

The apparatus may further include:

a connection establishment unit configured to establish a connection between the first WiFi-type smart device and the second WiFi-type smart device by a direct connection between the first WiFi-type smart device and the second WiFi-type smart device, such as WiFi direct; and a second sending unit configured to send an SSID and a password through the connection.

According to an example implementation of the present disclosure, the apparatus further includes:

a connection establishment unit configured to establish a connection between the first WiFi-type smart device and the second WiFi-type smart device by using WiFi direct; and the management frame that carries WiFi networking information is a management frame sent in the process of establishing the connection.

According to an example implementation of the present disclosure, the WiFi networking information includes an SSID and a password; and the WiFi networking information includes an SSID and a password, and the WiFi networking information is carried in a specified extension field of the management frame.

According to an example implementation of the present disclosure, the information sent together with the SSID and the password further includes at least one of verification information, encryption information and router authentication information;

where the SSID and the password are encrypted data when the encryption information is sent.

According to an example implementation of the present disclosure, the apparatus further includes:

a feedback receiving unit configured to receive feedback information indicating whether access to a network is successful from the second WiFi-type smart device.

According to an example implementation of the present disclosure, the first sending unit is specifically configured to:

send the management frame by invoking a WiFi direct interface; or send the management frame by invoking a custom interface.

The present disclosure further provides an apparatus for acquiring WiFi networking information, disposed in a second WiFi-type smart device, the apparatus including:

a monitoring unit configured to monitor a management frame sent by a first WiFi-type smart device; and a parsing unit configured to parse the management frame to obtain the WiFi networking information.

According to an example implementation of the present disclosure, the management frame includes: a probe request frame, a probe response frame, an association request frame, a reassociation request frame, an action frame or a beacon frame.

According to an example implementation of the present disclosure, the WiFi networking information includes a feature code, an SSID and a password.

According to an example implementation of the present disclosure, the apparatus further includes:

a connection establishment unit configured to establish a connection between the first WiFi-type smart device and the second WiFi-type smart device by using WiFi direct if the parsing unit parses out an identifier indicating provision of a networking information service from the management frame; and a receiving unit configured to receive an SSID and a password through the connection.

According to an example implementation of the present disclosure, the apparatus further includes:

a connection establishment unit configured to establish a connection between the second WiFi-type smart device and the first WiFi-type smart device by using WiFi direct; and the parsing unit parses the management frame monitored in the process of establishing the connection, to obtain the WiFi networking information.

According to an example implementation of the present disclosure, the WiFi networking information includes a feature code, an SSID and a password.

According to an example implementation of the present disclosure, the parsing unit is specifically configured to determine a monitored management frame in which a feature code is consistent with preset feature code information; and parse out the SSID and the password from the management frame based on a predetermined WiFi networking information format.

According to an example implementation of the present disclosure, the WiFi networking information includes: an SSID and a password; and the parsing unit is specifically configured to parse out the SSID and the password from a specified extension field of the management frame.

According to an example implementation of the present disclosure, the apparatus further includes at least one of the following units:

a verification unit configured to verify the SSID and the password by using verification information received together with the SSID and the password;

a decryption unit configured to decrypt the SSID and the password by using encryption information received together with the SSID and the password; and an authentication unit configured to send an authentication request to an accessed wireless router by using router authentication information received together with the SSID and the password.

According to an example implementation of the present disclosure, the apparatus further includes:

a feedback sending unit configured to send feedback information indicating whether access to a network is successful to the first WiFi-type smart device after the second WiFi-type smart device attempts to access the network by using the SSID and the password.

As shown from the foregoing technical solutions, in the present disclosure, a management frame carries WiFi networking information. The management frame may carry a relatively large amount of data (at least 32 bytes), and only a small number of packets need to be sent. Correspondingly, a WiFi-type smart device has a short delay when accessing a network, and does not require a complex fault-tolerant algorithm. Thus, the technological complexity is reduced. Moreover, the management frame avoids the situation that the WiFi-type smart device cannot access the network in a short time due to the multicast data compatibility problem.

BRIEF DESCRIPTION OF THE DRAWINGS

The accompanying drawings described herein are used to provide further understanding of the present disclosure, and constitute a part of the present disclosure. The drawings are used to explain the present disclosure, but are not to be interpreted as limiting the present disclosure.

DETAILED DESCRIPTION

In order to make the objectives, the technical solutions and the advantages of the present disclosure clearer, the present disclosure is described in detail below with reference to the accompanying drawings and specific example embodiments.

A first WiFi-type smart device creates a management frame that carries WiFi networking information and sends the management frame, so that a second WiFi-type smart device monitors and parses the management frame to obtain the WiFi networking information. Here, the management frame may include, but is not limited to, a probe request frame, a probe response frame, an association request frame, a reassociation request frame, an action frame or a beacon frame.

Figure 1:
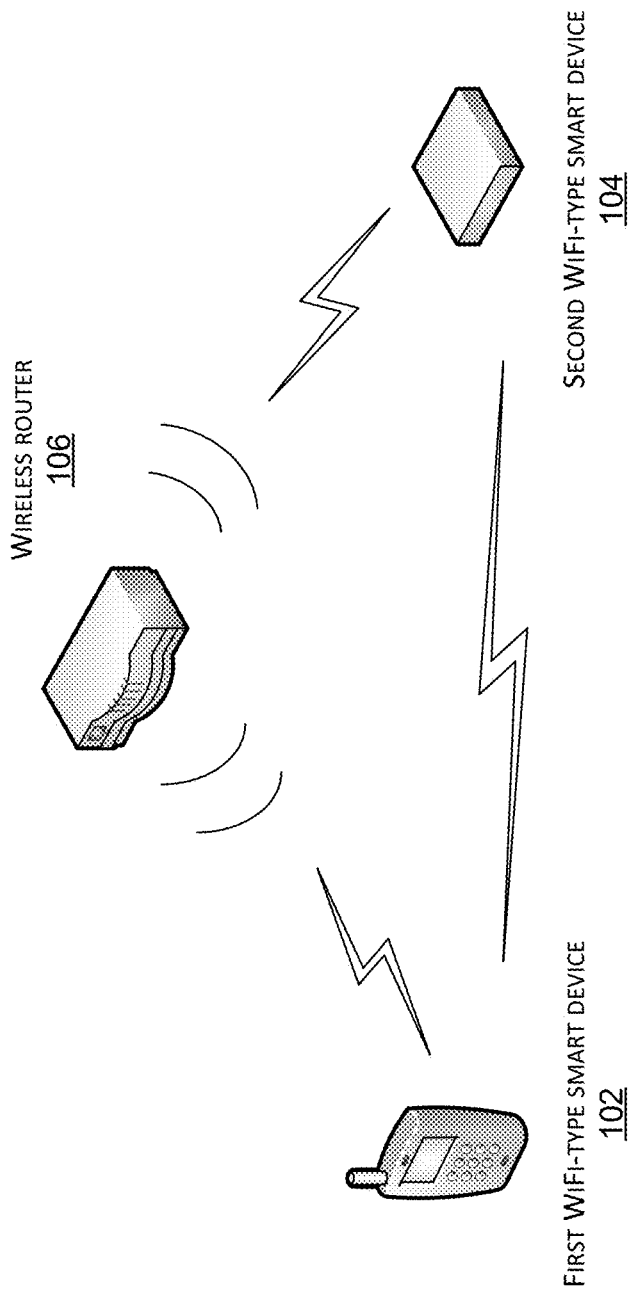
FIG. 1 is a schematic diagram of a system on which an example embodiment of the present disclosure is based.

FIG. 1 is a schematic diagram of a system of which an example embodiment of the present disclosure is based, where a first WiFi-type smart device 102 may be a smart device such as a smart phone, a tablet computer, or a notebook computer that includes a WiFi module and an input device. The input device may include a touch screen, a keyboard, a writing pad and the like. An SSID, a password and other WiFi networking information may be input conveniently by using these input devices. A second WiFi-type smart device 104 may be a smart home device such as a smart air conditioner, a smart humidifier, a smart weighing machine or a smart washing machine, and may also be a smart office device such as a WiFi-type printer. The second WiFi-type smart device generally includes a WiFi module, but may not necessarily include an input device such as a touch screen, a keyboard or a writing pad. A wireless router 106 may be connected with the first WiFi-type smart device 102 and the second WiFi-type device 104 through a wireless network. The first WiFi-type smart device 102 may directly connect with the second WiFi-type smart device 104 by using WiFi direct without through the wireless router 106.

The following example embodiments are all described by using a smart phone as an example of the first WiFi-type smart device and a smart home device as an example of the second WiFi-type smart device.

Figure 2:
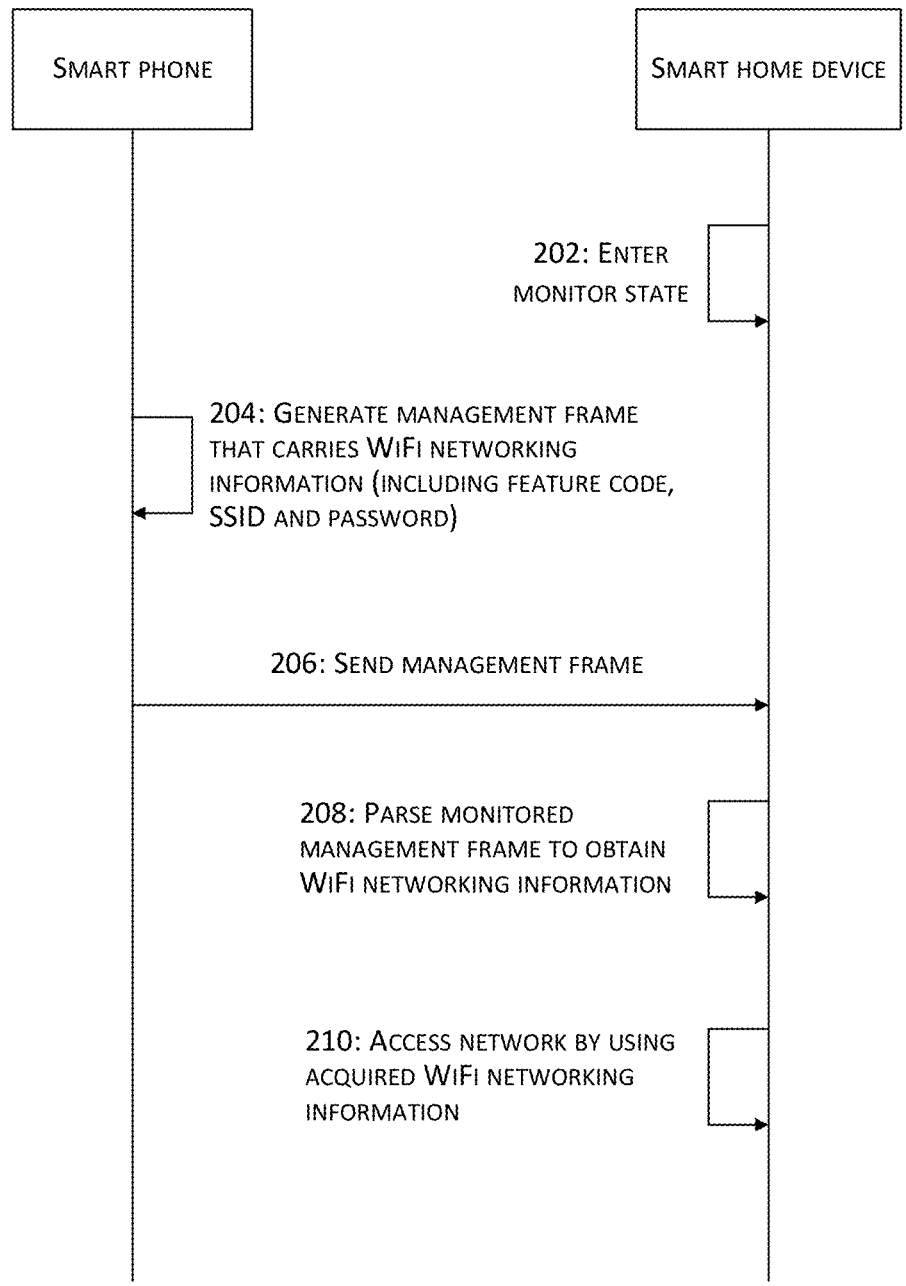
FIG. 2 is a flowchart of a first method according to an example embodiment of the present disclosure.

FIG. 2 is a flowchart of a first method according to an example embodiment of the present disclosure. As shown in FIG. 2, the method may include the following steps:

In step 202, a smart home device enters a monitor state.

A WiFi module in a WiFi-type smart home device generally has two modes. One is a monitor mode, and the other is a station mode. Here, the monitor mode is mainly used for monitoring data packets in a wireless network, while the station mode is a working mode after the WiFi device is networked (connected to a router). When the smart home device enters the monitor mode, it enters a monitor state. In the example embodiment of the present disclosure, the smart home device may be in a monitor state by default, and may also be switched to the monitor state by a user manually.

In step 204, the smart phone generates a management frame that carries WiFi networking information, where the WiFi networking information includes a feature code, an SSID and a password of a target router, and so on.

The management frame in this step may be a probe request frame, a probe response frame, an action frame, a beacon frame, or the like.

The management frame may carry the feature code as well as the SSID and password of the target router based on a predetermined format. The feature code is used to represent that the management frame carries WiFi networking information. The SSID and password of the target router are used for connecting a smart terminal device to a wireless router, so that the smart terminal device may access a target network.

For example, the management frame carries a feature code, an SSID and a password by using a contiguous storage space of 50 bytes. Here, it is assumed that a name identifier agreed on by two sides (which, for the purpose of the present example, may be a character string "APCP") is employed as the feature code, which occupies 4 bytes, and the remaining 46 bytes are used to carry the SSID and the password.

In addition, the WiFi networking information may also include at least one of verification information, encryption information and router authentication information, in addition to the feature code, the SSID and the password. Here, the verification information is used for verifying the WiFi networking information. The encryption information is used for indicating an encryption scheme. For example, the Data Encryption Standard (DES), the International Data Encryption Algorithm (IDEA) or other encryption schemes may be employed. The router authentication information is used for indicating the type of authentication required during access to a network. For example, wired equivalent privacy (WEP), Wi-Fi protected access (WPA), WPA2, and the like may be employed.

For another example, the management frame carries a feature code, an SSID a password and verification information by using a contiguous storage space of 50 bytes. Here, it is assumed that an name identifier (e.g, the character string "APCP") occupying 4 bytes is employed as the feature code. The last 2 bytes are used to carry a check code. The remaining 44 bytes are used to carry the SSID and the password. Other methods of carrying information are similar to this method, and are not exemplified.

In order to ensure security, the SSID and the password in the WiFi networking information may be encrypted. The encryption may be carried out in a predetermined method or in a method indicated by the encryption information carried in the WiFi networking information.

In step 206, the management frame that carries the WiFi networking information is sent by invoking a WiFi direct interface.

The smart phone may send the management frame by invoking a WiFi direct interface. At present, most smart phones may support a WiFi direct technology, and may send the management frame directly by invoking a WiFi direct interface. For example, in an iOS platform, APPLE has launched MultipeerConnectivity.framework after iOS7.0, which mainly provides a solution for point-to-point communication between iOS devices without access to the Internet. In this case, the solution may employ a service publishing API (MCNearbyService Advertiser or MCAdvertiser Assistant) in the framework to send the management frame that carries WiFi networking information.

If a self-developed smart phone is used, an interface may also be customized during development, and the management frame is sent through the custom interface.

Steps 204 and 206 may be performed when triggered by a user. For example, a user enters an SSID and a password to a smart phone or selects a scanned SSID and enters a password, and then triggers the smart phone to perform steps 204 and 206 by clicking on a function button or the like.

In addition, step 202 may also be performed after steps 204 and 206, or performed concurrently with steps 204 and 206. For example, a user may switch a smart home device to a monitor state while or after a smart phone sends a management frame that carries WiFi networking information.

It should be noted that, in the example embodiment of the present application, the management frame sent by the smart phone does not need to pass through a router, but may be directly sent to a WiFi-type smart device in a monitor state based on a WiFi direct technology.

In step 208, the smart home device parses the monitored management frame to obtain the WiFi networking information.

In this step, feature code information may be preset in the smart home device, and the smart home device first determines whether feature codes included in the monitored management frames are consistent with the preset feature code information, and filters out management frames whose feature codes are not consistent with the preset feature code information. For management frames whose feature codes are consistent with the preset feature code information, SSIDs and passwords are parsed from the management frames based on a predetermined WiFi networking information format.

For example, the name identifier "APCP" is preset as feature code information in the smart home device. Content included in a received management frame is compared with the name identifier "APCP" to determine whether the management frame includes the name identifier "APCP." It is determined that the management frame does not include WiFi networking information if it does not include the name identifier "APCP." It is determined that the management frame includes WiFi networking information if it includes the name identifier "APCP," and parsing may be carried out based on a predetermined WiFi networking information format. For example, an SSID and a password are acquired from 44 bytes following the feature code information, and verification is carried out by using a check code in the next 2 bytes.

In addition, if the SSID and the password are encrypted, the smart home device may carry out decryption based on a predetermined encryption scheme or an encryption scheme indicated by encryption information acquired from the WiFi networking information, to obtain a decrypted SSID and a decrypted password.

According to this parsing method, the WiFi networking information may be carried without being limited by an invoked interface or limited by a specific type of a management frame used.

In step 210, the smart home device accesses a network by using the acquired WiFi networking information.

The smart home device may connect to a wireless router by using the parsed out SSID and password to access a network, and may further send an authentication request to the connected wireless router by using router authentication information parsed from the WiFi networking information.

Figure 3:
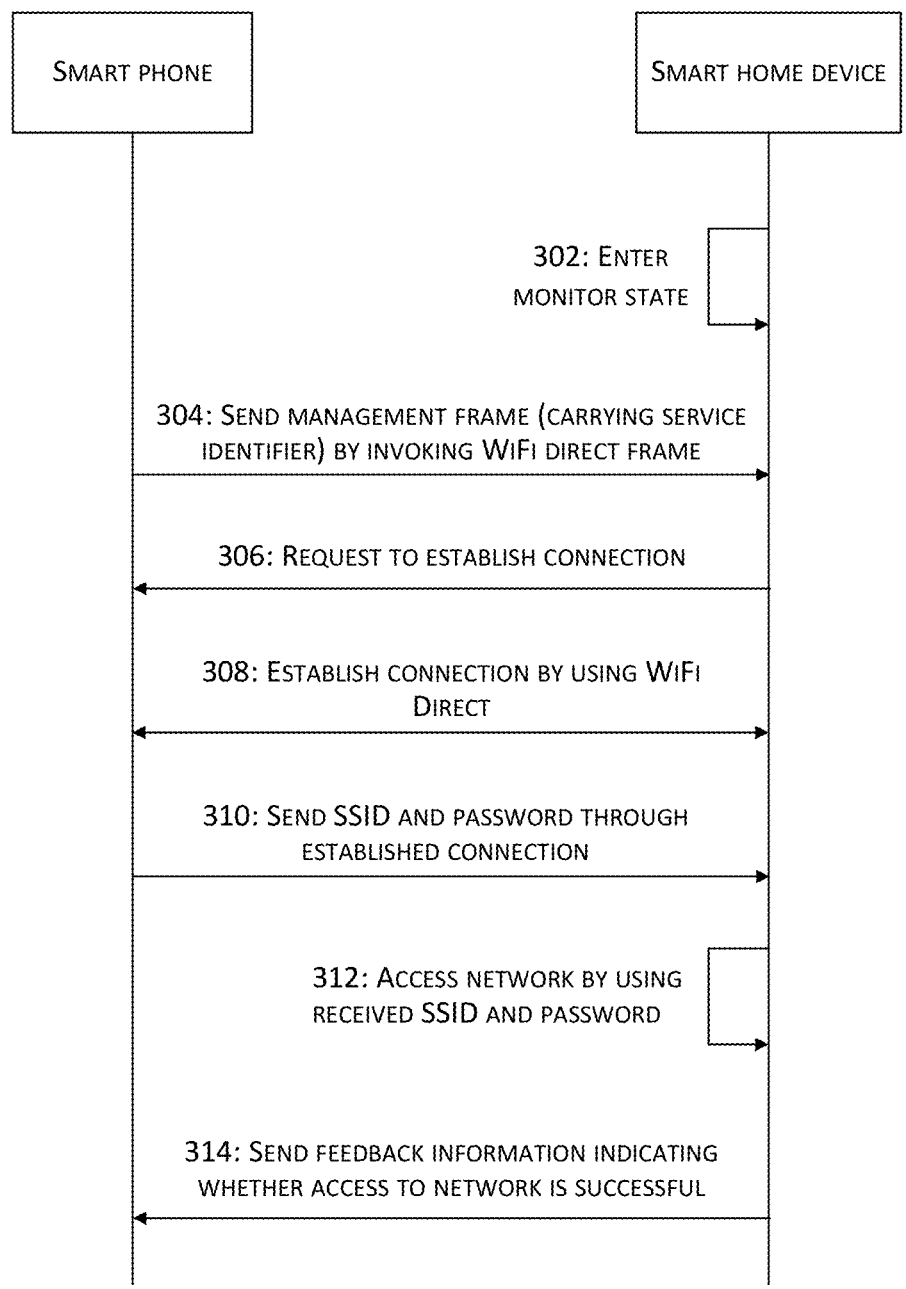
FIG. 3 is a flowchart of a second method according to an example embodiment of the present disclosure.

FIG. 3 is a flowchart of a second method according to an example embodiment of the present disclosure. As shown in FIG. 3, the method may include the following steps:

In step 302, a smart home device enters a monitor state.

This step is similar to step 202, and is not described in detail again.

In step 304, the smart phone invokes a WiFi direct interface to send a management frame that carries a service identifier. The service identifier indicates provision of a networking information service.

For the interface invoked to send the management frame, reference may be made to the related description about step 206 shown in FIG. 2, and details are not described again.

In this step, the management frame may not carry a specific SSID or password, but carries a service identifier used for indicating provision of a networking information service. The service identifier may be a feature code or a specific service name.

Similarly, step 302 and step 304 may be performed in any sequence or performed at the same time.

In step 306, the smart home device requests to connect to a smart phone after monitoring the management frame that carries the service identifier.

In step 308, the smart phone receives the request and establishes a connection with the smart home device.

Figure 4:
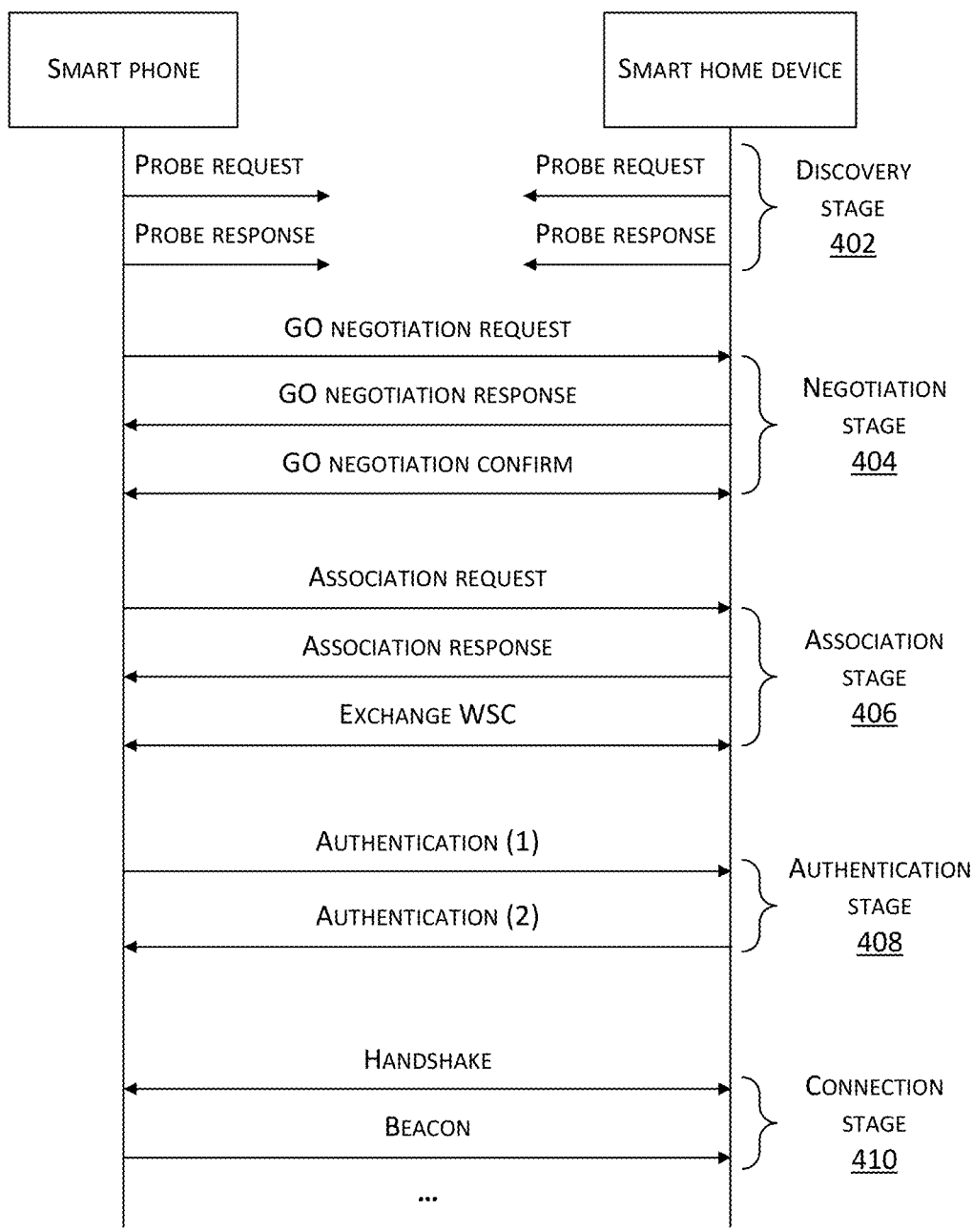
FIG. 4 is a schematic diagram of a process of establishing a connection by using a WiFi direct technology according to an example embodiment of the present disclosure.

A connection may be established between the smart home device and the smart phone by using a WiFi direct technology. The process of establishing a connection by using a WiFi direct technology is briefly introduced in the following. The establishment of the connection is as shown in FIG. 4, and mainly includes the following stages:

Discovery stage 402: the smart phone and the smart home device are both in a monitor state, and send a probe request frame to each other. The probe request frame carries an identifier of the device that sends the frame. The device that detects the probe request frame returns a probe response frame. The probe response frame carries a device identifier of the frame.

Negotiation stage 404: this stage mainly includes negotiating a GroupOwner (GO) between the smart phone and the smart home device, and includes a GO negotiation request frame, a GO negotiation response frame, and a GO negotiation confirm frame. The negotiated GO plays a role similar to an AP.

Association stage 406: WiFi Simple Config (WSC, WiFi configuration information) is associated and exchanged, where the association process includes an association request frame and an association response frame.

Authentication stage 408: information is negotiated and authenticated. The authentication here mainly refers to negotiating a method in which a device serving as a GO authenticates another device. Here, the smart phone and the smart home device may further authenticate the identity of the other side.

Connection stage 410: a connection is established by a handshake.

In step 310, the smart phone sends an SSID and a password by using the connection established with the smart home device.

At least one of verification information, encryption information and router authentication information may also be sent at the same time in addition to the SSID and the password. Here, the SSID and the password may be encrypted information. The encryption may be carried out based on a predetermined scheme or a scheme indicated by encryption information carried in the WiFi networking information.

In step 312, the smart home device accesses a network by using the received SSID and password.

The smart home device may connect to a wireless router by using the received SSID and password, to access a network, and may further send an authentication request to the connected wireless router by using the received router authentication information.

In step 314, the smart home device sends feedback information indicating whether access to the network is successful to the smart phone.

In this method, the smart phone may acquire the feedback information indicating whether access to the network is successful from the smart home device. The smart phone may cut off the connection established with the smart home device if access to the network is successful. The smart phone may re-send an SSID and a password by using the connection established with the smart home device if access to the network fails.

Figure 5:
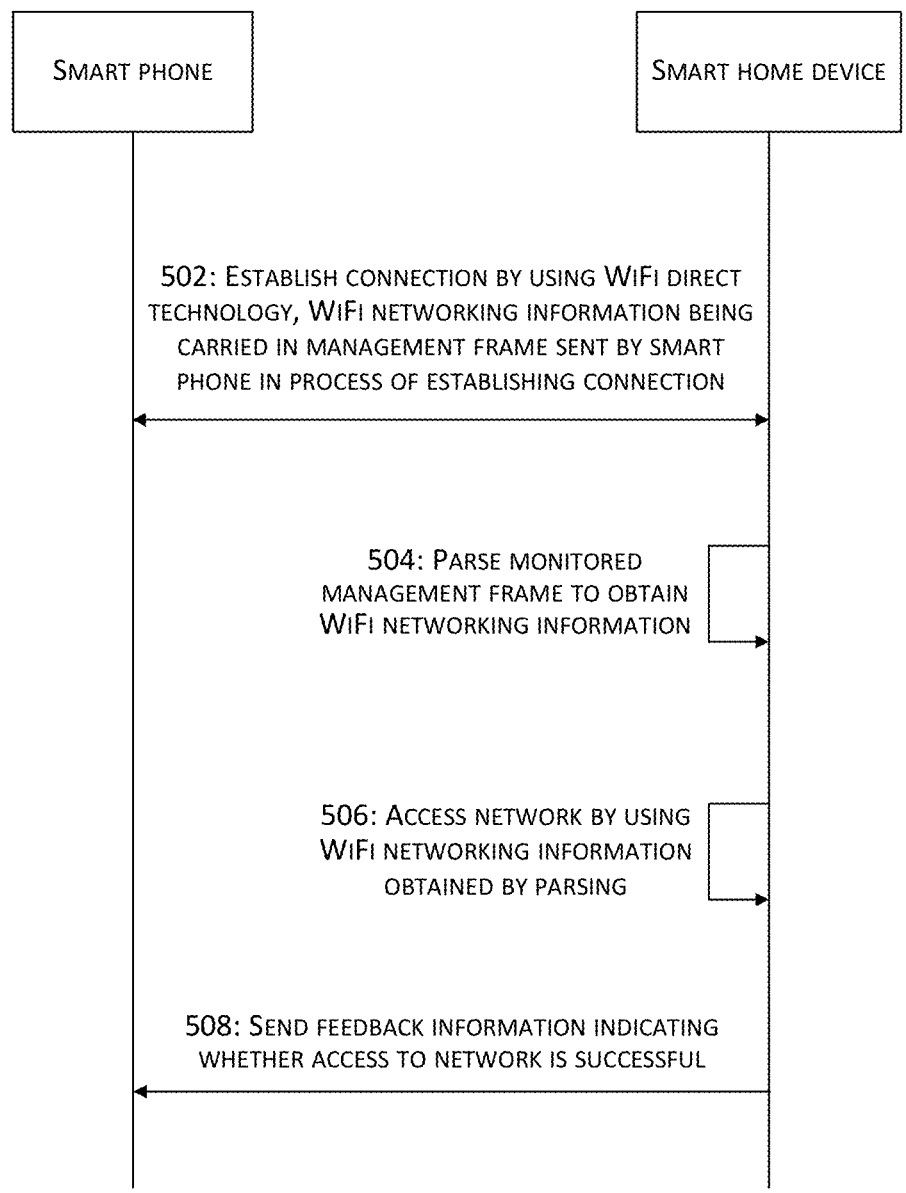
FIG. 5 is a flowchart of a third method according to an example embodiment of the present disclosure.

FIG. 5 is a flowchart of a third method according to an example embodiment of the present disclosure. As shown in FIG. 5, the method may include the following steps:

In step 502, a smart home device establishes a connection with a smart phone by using a WiFi direct technology, and a management frame sent by the smart phone in the process of establishing the connection carries WiFi networking information.

It may be seen from the connection establishment process shown in FIG. 4 that, the smart phone may send a probe request frame, a probe response frame, an association request frame, a reassociation request frame, an action frame (which is optionally sent at the discovery stage and the negotiation stage), and a beacon frame (which will be sent after a successful handshake) in this process. In the example embodiment of the present disclosure, the smart phone may send WiFi networking information by using the frames.

Here, the WiFi networking information may be carried in, but not limited to, the following two methods:

First method: the WiFi networking information at least includes a feature code, an SSID and a password, and the method of carrying the WiFi networking information is similar to that in the example embodiment shown in FIG. 2, which is not described here again. The WiFi networking information may further include at least one of verification information, encryption information and router authentication information. For this method, it is unnecessary to limit a specific field of the WiFi networking information in the management frame, and the implementation is relatively flexible.

Second method: the WiFi networking information at least includes an SSID and a password, and may not include a feature code. The SSID and the password are carried in a specified extension field of the management frame. In other words, a field of the management frame is extended to carry the WiFi network information at a specified position. Likewise, the WiFi networking information may further include at least one of verification information, encryption information and router authentication information.

In step 504, the smart home device parses a monitored management frame, to obtain the WiFi networking information.

If the WiFi networking information is carried by using the first method, the smart home device first determines whether a feature code included in the monitored management frame is consistent with preset feature code information, and filters out management frames whose feature codes are inconsistent with the preset feature code information. The management frame whose feature code is consistent with the preset feature code information is parsed based on a predetermined WiFi networking information format, to obtain the SSID and the password.

If the WiFi networking information is carried by using the second method, the smart home device may parse out the SSID and the password from the specified extension field of the management frame.

In step 506, the home smart device accesses a network by using the acquired WiFi networking information.

In step 508, the home smart device sends feedback information indicating whether access to the network is successful to the smart phone.

The method provided in the present disclosure is described above, and the apparatus provided in the present disclosure will be described in detail below in combination with example embodiments.

Figure 6A:
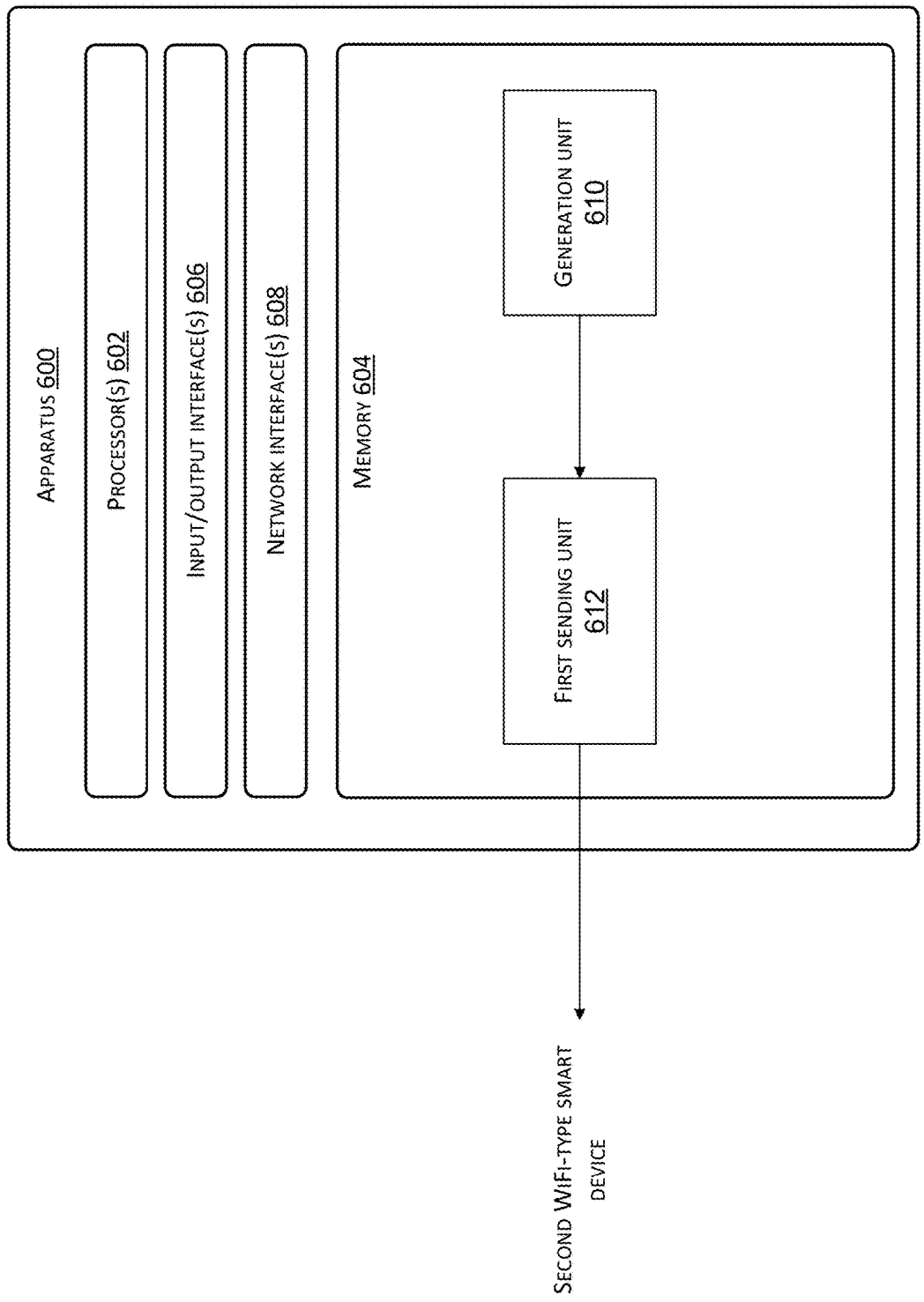
FIG. 6a is a structural diagram of a first apparatus disposed in a first WiFi-type smart device according to an example embodiment of the present disclosure.

FIG. 6a is a structural diagram of an apparatus 600 according to an example embodiment of the present disclosure. The apparatus 600 may be configured at a first WiFi-type smart device. As shown in FIG. 6a, the apparatus 600 includes one or more processor(s) 602 or data processing unit(s) and memory 604. The apparatus 600 may further include one or more input/output interface(s) 606 and one or more network interface(s) 608. The memory 604 is an example of computer readable media.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include transitory media such as modulated data signals and carriers.

The memory 604 may store therein a plurality of modules or units including a generation unit 610 and a first sending unit 612.

The generation unit 610 is responsible for generating a management frame that carries WiFi networking information. Here, the management frame may include, but not limited to, a probe request frame, a probe response frame, an association request frame, a reassociation request frame, an action frame or a beacon frame.

The first sending unit 612 is configured to send the management frame to be monitored by a second WiFi-type smart device. The first sending unit 612 may send the management frame by invoking a WiFi direct interface. If the apparatus is a self-developed WiFi-type smart device, the first sending unit may also send the management frame by invoking a custom interface.

As an implementation, the WiFi networking information may include a feature code, an SSID and a password. In addition, the WiFi networking information may also include at least one of verification information, encryption information and router authentication information. An apparatus structure corresponding to this implementation is as shown in FIG. 6a.

The feature code and the SSID and password of the target router may be carried in the management frame based on a predetermined format. The feature code is used to represent that the management frame carries WiFi networking information. The SSID and password of the target router are used for connecting a smart terminal device to a wireless router, so that the smart terminal device may access a target network. The verification information is used for verifying the WiFi networking information. The encryption information is used for indicating an encryption scheme. For example, a DES, an IDEA or other encryption schemes may be employed. The router authentication information is used for indicating the type of authentication required during access to a network. For example, WEP, WPA, WPA2, and the like may be employed.

Figure 6B:
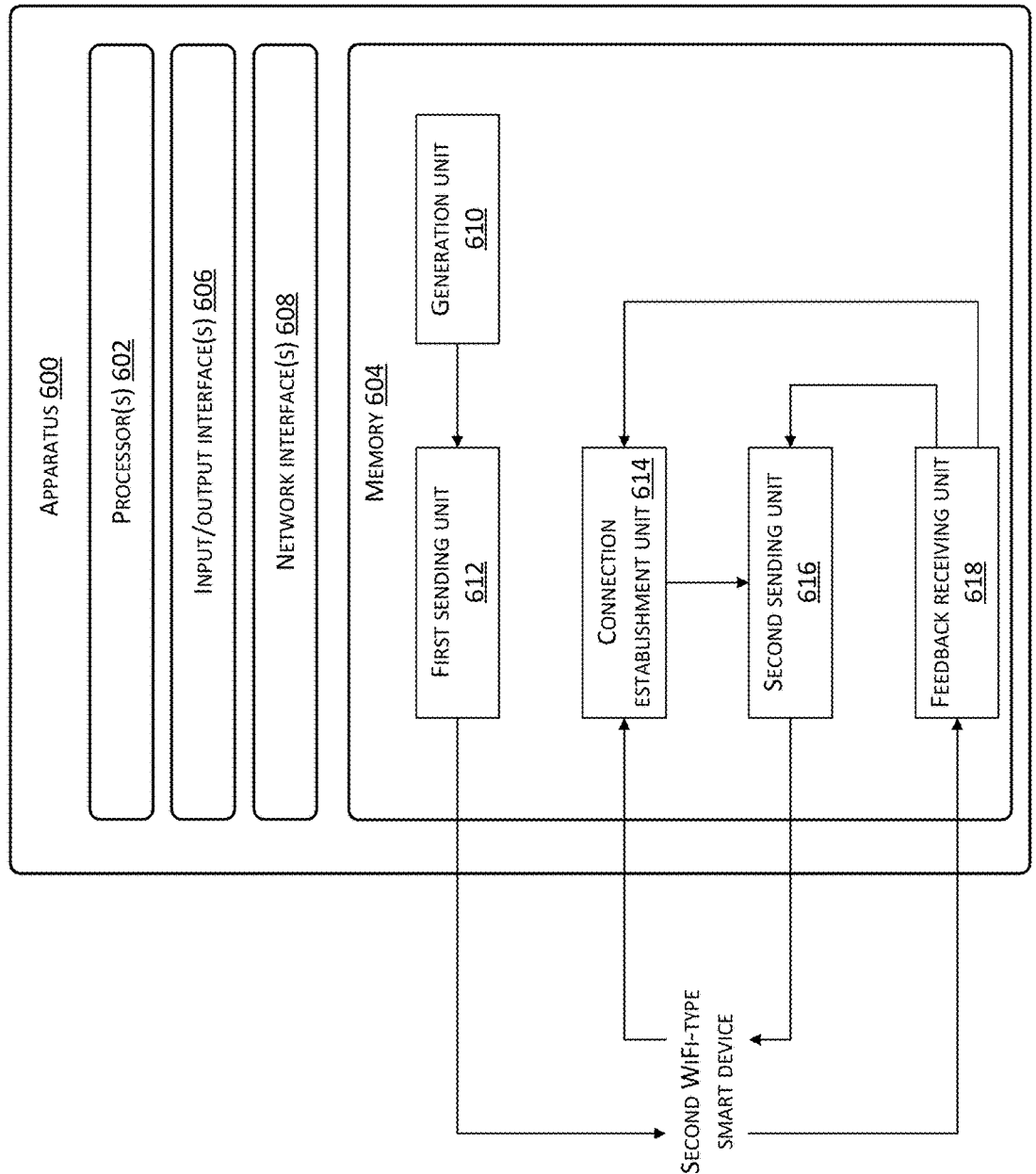
FIG. 6b is a structural diagram of a second apparatus disposed in a first WiFi-type smart device according to an example embodiment of the present disclosure.

As another implementation, the WiFi networking information includes an identifier indicating provision of a networking information service. A connection establishment unit 614 stored on memory 604 may establish a connection between the first WiFi-type smart device and the second WiFi-type smart device by using WiFi direct. A second sending unit 616 stored on memory 604 may send an SSID and a password through the connection. In other words, the first WiFi-type smart device may first send a service identifier by using the management frame, and then establish a connection and sends an SSID and a password through the connection after the second WiFi-type smart device detects the service identifier and sends a connection request. An apparatus structure corresponding to the apparatus may be as shown in FIG. 6b.

Figure 6C:
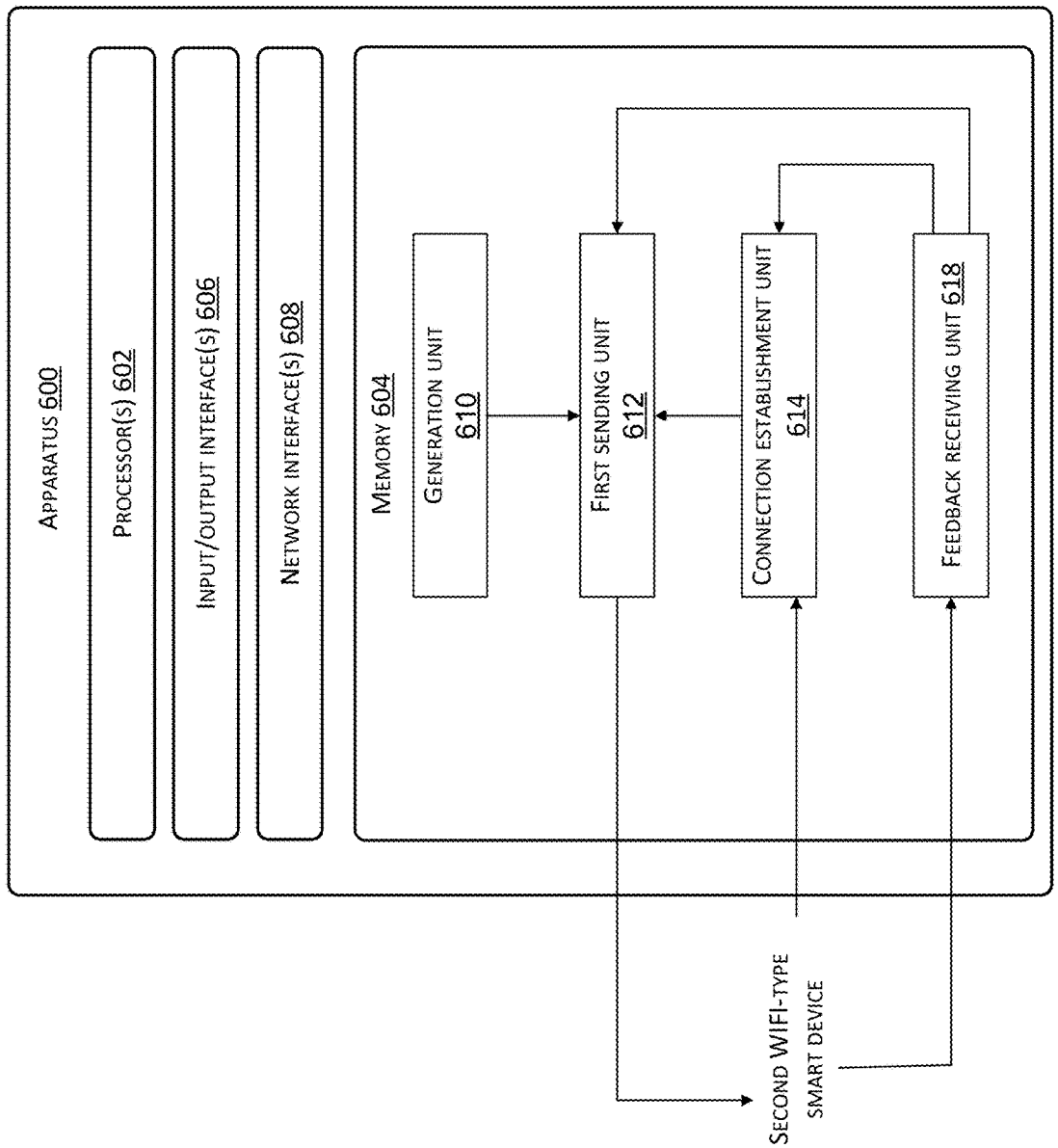
FIG. 6c is a structural diagram of a third apparatus disposed in a first WiFi-type smart device according to an example embodiment of the present disclosure.

As a further implementation, the connection establishment unit 614 may establish a connection between the first WiFi-type smart device and the second WiFi-type smart device by using WiFi direct. The frame sent by the first sending unit 612 is a management frame sent in the process of establishing the connection. An apparatus structure corresponding to this implementation may be as shown in FIG. 6c.

Corresponding to this case, the WiFi networking information may include a feature code, an SSID and a password. Alternatively, the WiFi networking information may not include a feature code but only include an SSID and a password. For the latter method, the WiFi networking information may be carried in a specified extension field of the management frame.

Here, information sent together with the SSID and the password may further include at least one of verification information, encryption information and router authentication information. Here, the SSID and the password are encrypted data when the encryption information is sent.

In the latter two implementations, a feedback receiving unit 618 stored on memory 604 is responsible for receiving feedback information indicating whether access to a network is successful from the second WiFi-type smart device. If access to the network is successful, the connection establishment unit 614 may cut off the connection established with the smart home device. If access to the network fails, the first sending unit 612 or the second sending unit 616 may re-send the SSID and the password through the connection established with the smart home device.

Figure 7A:
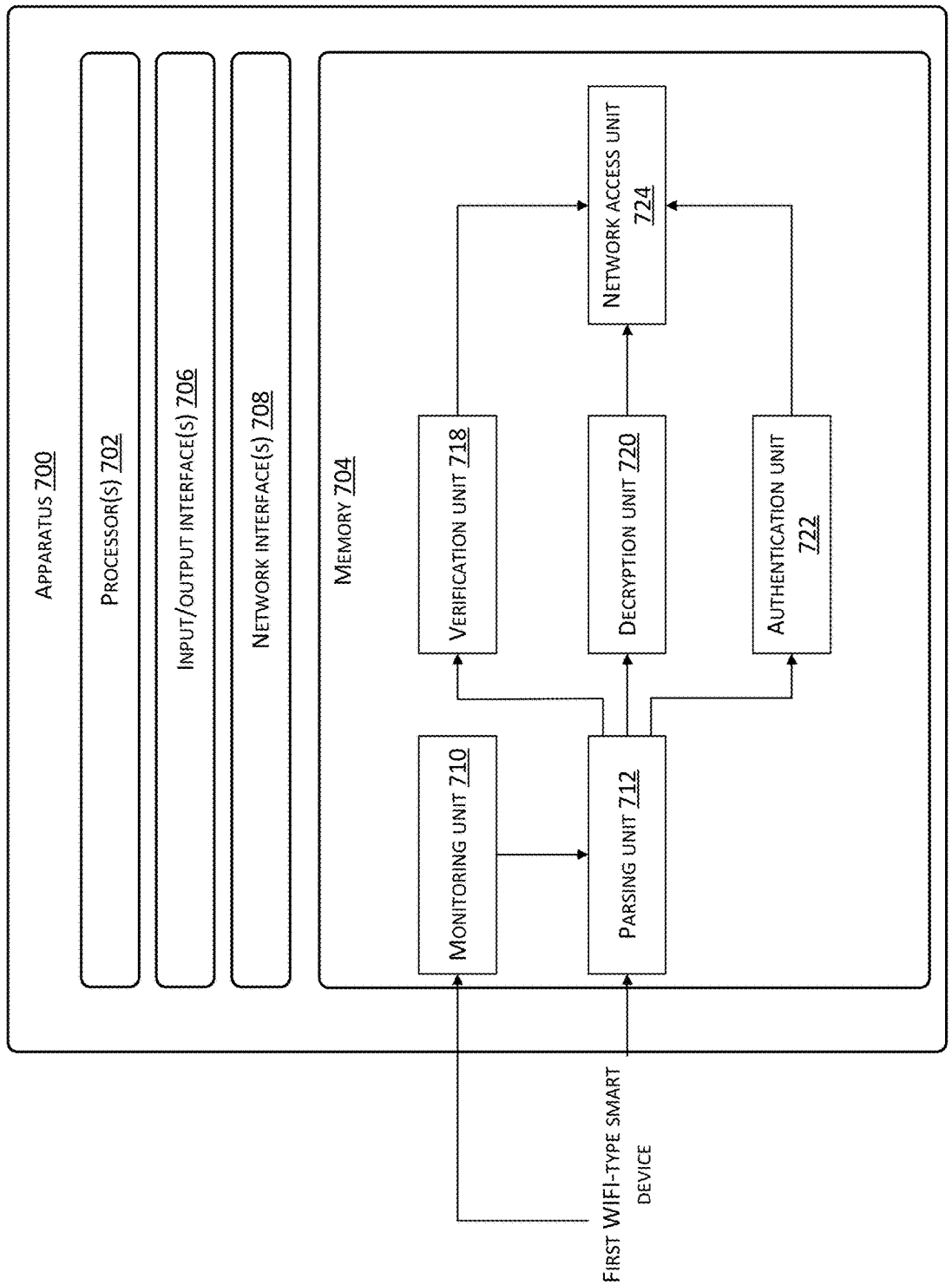
FIG. 7a is a structural diagram of a first apparatus disposed in a second WiFi-type smart device according to an example embodiment of the present disclosure.

FIG. 7a is a structural diagram of a second apparatus 700 according to an example embodiment of the present disclosure. The apparatus 700 is configured at a second WiFi-type smart device. As shown in FIG. 7a, the apparatus 700 includes one or more processor(s) 702 or data processing unit(s) and memory 704. The apparatus 700 may further include one or more input/output interface(s) 706 and one or more network interface(s) 708. The memory 704 is an example of computer readable media.

The memory 704 may store therein a plurality of modules or units including a monitoring unit 710 and a parsing unit 712.

The monitoring unit 710 is responsible for monitoring a management frame sent by a first WiFi-type smart device.

The parsing unit 712 is responsible for parsing the management frame to obtain WiFi networking information. Here, the management frame includes: a probe request frame, a probe response frame, an association request frame, a reassociation request frame, an action frame or a beacon frame.

As an implementation, the parsing unit 712 may parse out a feature code, an SSID and a password from the WiFi networking information. Specifically, the parsing unit 712 may determine a monitored management frame in which a feature code is consistent with preset feature code information, and parse out the SSID and the password from the management frame based on a predetermined WiFi networking information format. A structural diagram of an apparatus in this implementation is as shown in FIG. 7a.

Figure 7B:
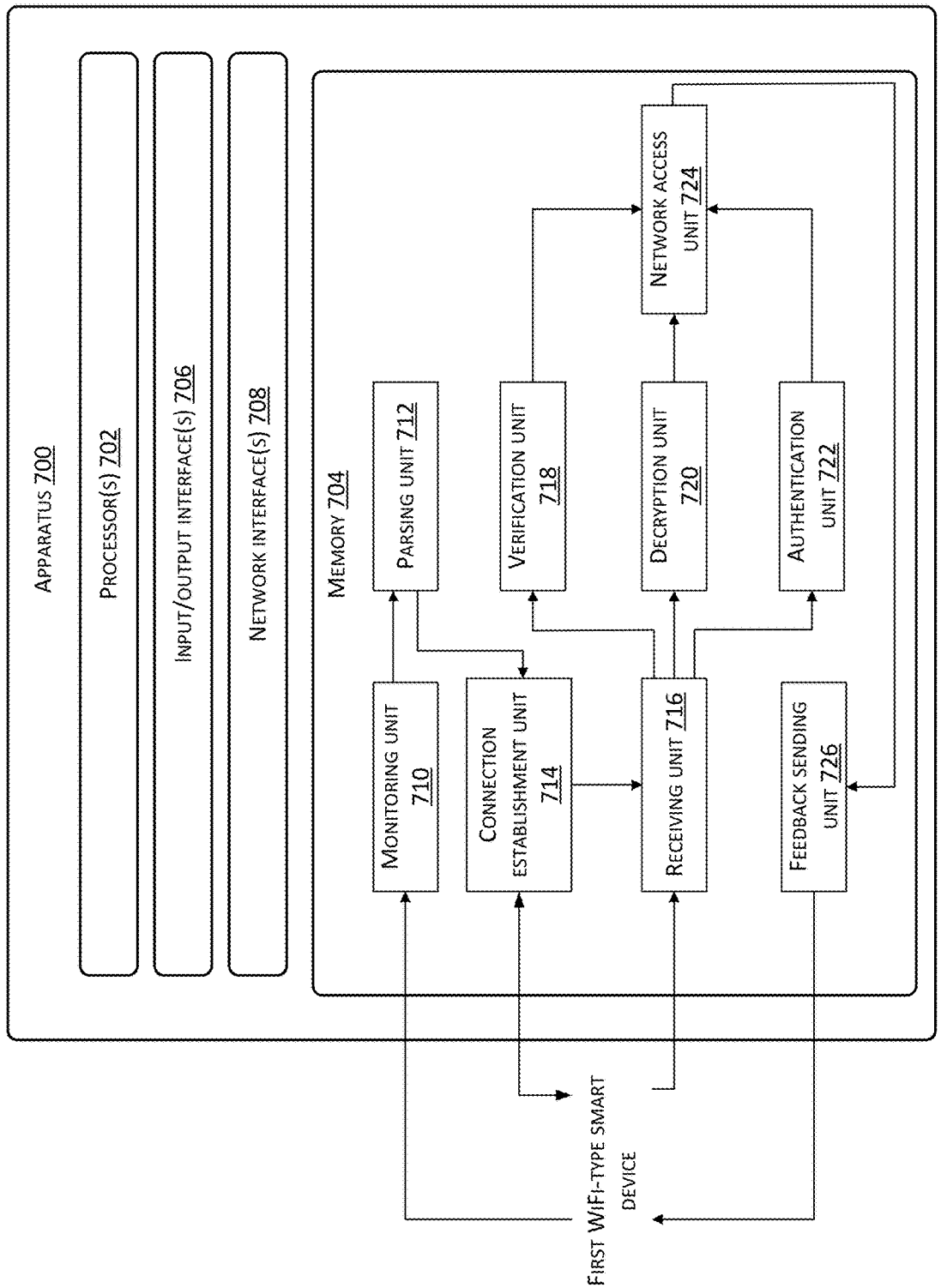
FIG. 7b is a structural diagram of a second apparatus disposed in a second WiFi-type smart device according to an example embodiment of the present disclosure.

As another implementation, the parsing unit 712 may parse out an identifier indicating provision of a networking information service from the WiFi networking information, and then a connection establishment unit 714 may establish a connection between the first WiFi-type smart device and the second WiFi-type smart device by using WiFi direct. A request for establishing a connection may be sent by the connection establishment unit 714. A receiving unit 716 may receive an SSID and a password through the connection. A structural diagram of an apparatus in this implementation is as shown in FIG. 7b.

Figure 7C:
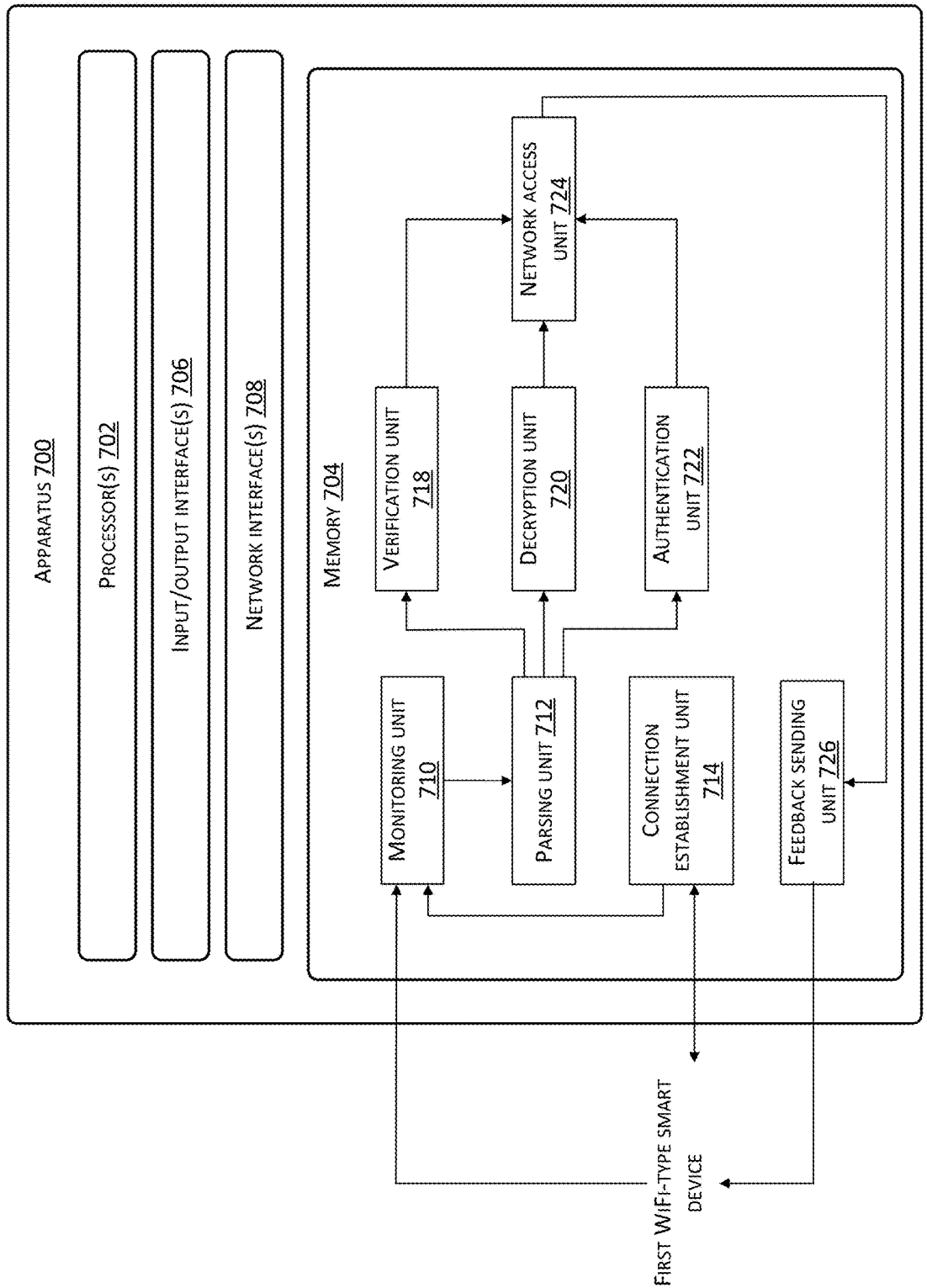
FIG. 7c is a structural diagram of a third apparatus disposed in a second WiFi-type smart device according to an example embodiment of the present disclosure.

As a further implementation, the connection establishment unit 714 may establish a connection between the first WiFi-type smart device and the second WiFi-type smart device by using WiFi direct. The parsing unit 712 may parse the management frame monitored by the monitoring unit 710 in the process of establishing the connection, to obtain the WiFi networking information. A structural diagram of an apparatus in this implementation is as shown in FIG. 7c.

In this implementation, the WiFi networking information may include: a feature code, an SSID and a password. The parsing unit 712 may determine a monitored management frame in which a feature code is consistent with preset feature code information, and parse the management frame based on a predetermined WiFi networking information format to obtain the SSID and the password.

Alternatively, the WiFi networking information may include: an SSID and a password. The parsing unit 712 parses out the SSID and the password from a specified extension field of the management frame.

In the above three implementations, information sent together with the SSID and the password may further include, but is not limited to, at least one of verification information, encryption information and router authentication information.

In FIGS. 7(a)-7(c), the memory 704 may further store therein a plurality of modules or units including a verification unit 718, a decryption unit 720, an authentication unit 722, and a network access unit 724.

The verification unit 718 is responsible for verifying the SSID and the password by using verification information received together with the SSID and the password.

The decryption unit 720 is responsible for decrypting the SSID and the password by using encryption information received together with the SSID and the password. The decryption unit 720 may also be responsible for decrypting the SSID and the password by using predetermined encryption information.

The authentication unit 722 is responsible for sending an authentication request to an accessed wireless router by using router authentication information received together with the SSID and the password.

The network access unit 724 is responsible for accessing to a network. For example, the network access unit 724 is responsible for connecting to a wireless router by using an SSID and a password to access the network. The network access unit 724 may store in memory 704. Alternatively, the network access unit 724 may be a unit that already exists in the second WiFi-type smart device.

In FIGS. 7(b) and 7(c), a feedback sending unit 726 stored on memory 704 is responsible for sending feedback information indicating whether access to a network is successful to the first WiFi-type smart device after a network access unit 724 attempts to access the network.

In the several example embodiments provided in the present disclosure, it should be understood that the disclosed apparatuses and methods may be implemented in other methods. The apparatus example embodiments described above are only exemplary. For example, the unit division is merely division based on logical functions and there may be other division methods in an actual implementation.

In addition, functional units in the example embodiments of the present disclosure may be integrated into one processing unit, or each of the units may exist alone physically, or two or more units may be integrated into one unit. The integrated unit may be implemented in the form of hardware, or may be implemented in the form of a software functional unit.

The integrated unit implemented in the form of a software functional unit may be stored in a computer readable storage medium. The software functional unit is stored in a storage medium, and includes several instructions for instructing a computer device (which may be a personal computer, a server, a network device or the like) or a processor to perform all or a part of the steps of the methods described in the example embodiments of the present disclosure. The foregoing storage medium includes: any medium that may store program code, such as a USB flash drive, a removable hard disk, a Read-Only Memory (ROM), a Random Access Memory (RAM), a magnetic disk, or an optical disc.

Any process or method described in the flowchart or in other manners here may be construed as a module, segment or part representing code that includes one or more executable instructions for implementing an example logic function or process step. In addition, the scope of the example embodiments of the present disclosure includes other implementations, wherein the functions may be executed in a sequence different from the shown or discussed sequence, including executing the functions basically simultaneously or in a reverse order according to the related functions. This should be understood by persons skilled in the technical field to which the example embodiments of the present disclosure belong.

The above descriptions are only example embodiments of the present disclosure, but are not intended to limit the present disclosure. Any modification, equivalent replacement, improvement and the like made within the spirit and principle of the present disclosure should be encompassed in the protection scope of the present disclosure.

The present disclosure may further be understood with clauses as follows.

Clause 1. A method for sending WiFi networking information comprising:
generating, by a first WiFi-type smart device, a management frame that carries WiFi networking information; and
sending the management frame to be monitored by a second WiFi-type smart device.

Clause 2. The method of clause 1, wherein the management frame comprises: a probe request frame, a probe response frame, an association request frame, a reassociation request frame, an action frame or a beacon frame.

Clause 3. The method of clause 1, wherein the WiFi networking information comprises a feature code, a service set identifier (SSID) and a password.

Clause 4. The method of clause 1, wherein:
the WiFi networking information comprises an identifier indicating provision of a networking information service; and
the method further comprises:
sending an SSID and a password through a connection that is established by the first WiFi-type smart device and the second WiFi-type smart device by using WiFi direct.

Clause 5. The method of clause 1, wherein the method further comprises: establishing, by the first WiFi-type smart device, a connection with the second WiFi-type smart device by using WiFi direct; and
the management frame that carries WiFi networking information is a management frame sent in the process of establishing the connection.

Clause 6. The method of clause 1, 2 or 5, wherein the WiFi networking information comprises an SSID and a password, and the WiFi networking information is carried in a specified extension field of the management frame.

Clause 7. The method of clause 3 or 4, wherein the information sent together with the SSID and the password further comprises at least one of verification information, encryption information and router authentication information; and
the SSID and the password are encrypted data when the encryption information is sent.

Clause 8. The method of clause 4 or 5, wherein the method further comprises:
receiving, by the first WiFi-type smart device, feedback information indicating whether access to a network is successful from the second WiFi-type smart device.

Clause 9. The method of any of clauses 1 to 5, wherein the step of sending the management frame comprises:
sending, by the first WiFi-type smart device, the management frame by invoking a WiFi direct interface; or
sending, by the first WiFi-type smart device, the management frame by invoking a custom interface.

Clause 10. A method for acquiring WiFi networking information, comprising:
monitoring, by a second WiFi-type smart device, a management frame sent by a first WiFi-type smart device; and
parsing the management frame to obtain the WiFi networking information.

Clause 11. The method of clause 10, wherein the management frame comprises: a probe request frame, a probe response frame, an association request frame, a reassociation request frame, an action frame or a beacon frame.

Clause 12. The method of clause 10, wherein the WiFi networking information comprises a feature code, an SSID and a password.

Clause 13. The method of clause 10, further comprising:
establishing a connection with the first WiFi-type smart device by using WiFi direct if the second WiFi-type smart device parses out an identifier indicating provision of a networking information service from the management frame, and receiving an SSID and a password through the established connection.

Clause 14. The method of clause 10, further comprising:
establishing, by the second WiFi-type smart device, a connection with the first WiFi-type smart device by using WiFi direct; and parsing, by the second WiFi-type smart device, the management frame received in the process of establishing the connection, to obtain the WiFi networking information.

Clause 15. The method of clause 14, wherein the WiFi networking information comprises a feature code, an SSID and a password.

Clause 16. The method of clause 12 or 15, wherein the step of parsing the management frame to obtain the WiFi networking information comprises:

determining, by the second WiFi-type smart device, a monitored management frame in which a feature code is consistent with preset feature code information; and parsing out the SSID and the password from the management frame based on a predetermined WiFi networking information format.

Clause 17. The method of clause 14, wherein the WiFi networking information comprises: an SSID and a password; and the step of parsing the management frame to obtain the WiFi networking information comprises: parsing out, by the second WiFi-type smart device, the SSID and the password from a specified extension field of the management frame.

Clause 18. The method of clause 12, 13, 15 or 17, further comprising at least one of the following:

verifying, by the second WiFi-type smart device, the SSID and the password by using verification information received together with the SSID and the password;

decrypting, by the second WiFi-type smart device, the SSID and the password by using encryption information received together with the SSID and the password; and sending, by the second WiFi-type smart device, an authentication request to an accessed wireless router by using router authentication information received together with the SSID and the password.

Clause 19. The method of clause 13, 14, 15 or 17, further comprising:

sending, by the second WiFi-type smart device, feedback information indicating whether access to a network is successful to the first WiFi-type smart device after the second WiFi-type smart device attempts to access the network by using the SSID and the password.

Clause 20. An apparatus for sending WiFi networking information, disposed in a first WiFi-type smart device, wherein the apparatus comprises:

a generation unit configured to generate a management frame that carries WiFi networking information; and a first sending unit configured to send the management frame to be monitored by a second WiFi-type smart device.

Clause 21. The apparatus of clause 20, wherein the management frame comprises: a probe request frame, a probe response frame, an association request frame, a reassociation request frame, an action frame or a beacon frame.

Clause 22. The apparatus of clause 20, wherein the WiFi networking information comprises a feature code, an SSID and a password.

Clause 23. The apparatus of clause 20, wherein the WiFi networking information comprises an identifier indicating provision of a networking information service; and the apparatus further comprises:

a connection establishment unit configured to establish a connection between the first WiFi-type smart device and the second WiFi-type smart device by using WiFi direct; and a second sending unit configured to send an SSID and a password through the connection.

Clause 24. The apparatus of clause 20, wherein the apparatus further comprises:

a connection establishment unit configured to establish a connection between the first WiFi-type smart device and the second WiFi-type smart device by using WiFi direct; and the management frame that carries WiFi networking information is a management frame sent in the process of establishing the connection.

Clause 25. The apparatus of clause 20, 21 or 24, wherein the WiFi networking information comprises a feature code, an SSID and a password; and the WiFi networking information comprises an SSID and a password, and the WiFi networking information is carried in a specified extension field of the management frame.

Clause 26. The apparatus of clause 22 or 23, wherein the information sent together with the SSID and the password further comprises at least one of verification information, encryption information and router authentication information; and the SSID and the password are encrypted data when the encryption information is sent.

Clause 27. The apparatus of clause 23 or 24, further comprising:

a feedback receiving unit configured to receive feedback information indicating whether access to a network is successful from the second WiFi-type smart device.

Clause 28. The apparatus of any of clauses 20 to 24, wherein the first sending unit is specifically configured to:

send the management frame by invoking a WiFi direct interface; or send the management frame by invoking a custom interface.

Clause 29. An apparatus for acquiring WiFi networking information, disposed in a second WiFi-type smart device, wherein the apparatus comprises:

a monitoring unit configured to monitor a management frame sent by a first WiFi-type smart device; and a parsing unit configured to parse the management frame to obtain the WiFi networking information.

Clause 30. The apparatus of clause 29, wherein the management frame comprises: a probe request frame, a probe response frame, an association request frame, a reassociation request frame, an action frame or a beacon frame.

Clause 31. The apparatus of clause 29, wherein the WiFi networking information comprises a feature code, an SSID and a password.

Clause 32. The apparatus of clause 29, further comprising:

a connection establishment unit configured to establish a connection between the first WiFi-type smart device and the second WiFi-type smart device by using WiFi direct if the parsing unit parses out an identifier indicating provision of a networking information service from the management frame; and a receiving unit configured to receive an SSID and a password through the connection.

Clause 33. The apparatus of clause 29, wherein the apparatus further comprises:

a connection establishment unit configured to establish a connection between the second WiFi-type smart device and the first WiFi-type smart device by using WiFi direct; and the parsing unit parses the management frame monitored in the process of establishing the connection, to obtain the WiFi networking information.

Clause 34. The apparatus of clause 33, wherein the WiFi networking information comprises a feature code, an SSID and a password.

Clause 35. The apparatus of clause 31 or 34, wherein the parsing unit is specifically configured to determine a monitored management frame in which a feature code is consistent with preset feature code information; and parse out the SSID and the password from the management frame based on a predetermined WiFi networking information format.

Clause 36. The apparatus of clause 33, wherein the WiFi networking information comprises: an SSID and a password; and the parsing unit is specifically configured to parse out the SSID and the password from a specified extension field of the management frame.

Clause 37. The apparatus of clause 31, 34, 35 or 36, wherein the apparatus further comprises at least one of the following units:

a verification unit configured to verify the SSID and the password by using verification information received together with the SSID and the password;

a decryption unit configured to decrypt the SSID and the password by using encryption information received together with the SSID and the password; and an authentication unit configured to send an authentication request to an accessed wireless router by using router authentication information received together with the SSID and the password.

Clause 38. The apparatus of clause 32, 33, 34 or 36, further comprising:

a feedback sending unit configured to send feedback information indicating whether access to a network is successful to the first WiFi-type smart device after the second WiFi-type smart device attempts to access the network by using the SSID and the password.

What is claimed is:

1. A method comprising:
   establishing, by a first WiFi-type smart device, a WiFi direct connection with a second WiFi-type smart device;
   generating, by the first WiFi-type smart device, a management frame that carries networking information including WiFi networking information, the WiFi networking information further comprising a feature code representing that the management frame carries WiFi networking information, an SSID, and a password; and
   sending the management frame to the second WiFi-type smart device to request the second WiFi-type smart device to access a network based on the networking information, the request being operative to cause the second WiFi-type smart device to perform at least one of the following:
      verify the SSID and the password by using verification information sent together with the SSID and the password;
      decrypt the SSID and the password by using encryption information sent together with the SSID and the password; and
      send an authentication request to an accessed wireless router by using router authentication information sent together with the SSID and the password.

2. The method of claim 1, further comprising receiving feedback information from the second device indicating a result of access to the network.

3. The method of claim 1, further comprising establishing a direct connection between the first device and the second device.

4. The method of claim 3, wherein the network is distinct from the direct connection.

5. The method of claim 1, wherein the management frame includes:
   a probe request frame;
   a probe response frame;
   an association request frame;
   a reassociation request frame;
   an action frame; or
   a beacon frame.

6. The method of claim 1, wherein the WiFi networking information includes a feature code, a service set identifier (SSID) and a password.

7. The method of claim 1, wherein the WiFi networking information includes an identifier indicating provision of a networking information service.

8. The method of claim 1, further comprising:
   sending an SSID and a password to the second WiFi-type smart device by using WiFi direct.

9. The method of claim 1, wherein the WiFi networking information is carried in a specified extension field of the management frame.

10. The method of claim 1, wherein the network information includes at least one of verification information, encryption information and router authentication information.

11. The method of claim 1, wherein the sending the management frame includes:
    sending the management frame by invoking a WiFi direct interface.

12. A method comprising:
    establishing, by a second WiFi-type smart device, a WiFi direct connection with a first WiFi-type smart device;
    monitoring, by the second WiFi-type smart device, a management frame sent by a first WiFi-type smart device;
    determining a monitored management frame comprising a feature code consistent with preset feature code information;
    parsing out an SSID and a password from the management frame based on a predetermined WiFi networking information format to obtain networking information including WiFi networking information to access a network;
    at least one of the following:
       verifying the SSID and the password by using verification information received together with the SSID and the password;
       decrypting the SSID and the password by using encryption information received together with the SSID and the password; and
       sending an authentication request to an accessed wireless router by using router authentication information received together with the SSID and the password; and
    accessing the network by using the networking information.

13. The method of claim 12, further comprising:
    sending feedback information to the first device indicating a result of access to the network.

14. An apparatus comprising:
    one or more processors; and
    one or more memories storing thereon computer-readable instructions that, when executed by the one or more processors, cause the one or more processors to perform acts comprising:
       establishing a wireless connection with a first device;

determining a management frame sent by the first device via the WiFi connection, the management frame including a feature code that is consistent with preset feature code information;

parsing out login information from the management frame based on a predetermined information format;

accessing a wireless network by using the login information, the wireless network being distinct from the wireless connection; and sending feedback information to the first device indicating a result of access to the wireless network.

15. The apparatus of claim 14, wherein:
the wireless connection is a WiFi connection;
the wireless network is a WiFi network.

\* \* \* \* \*